3,064,145

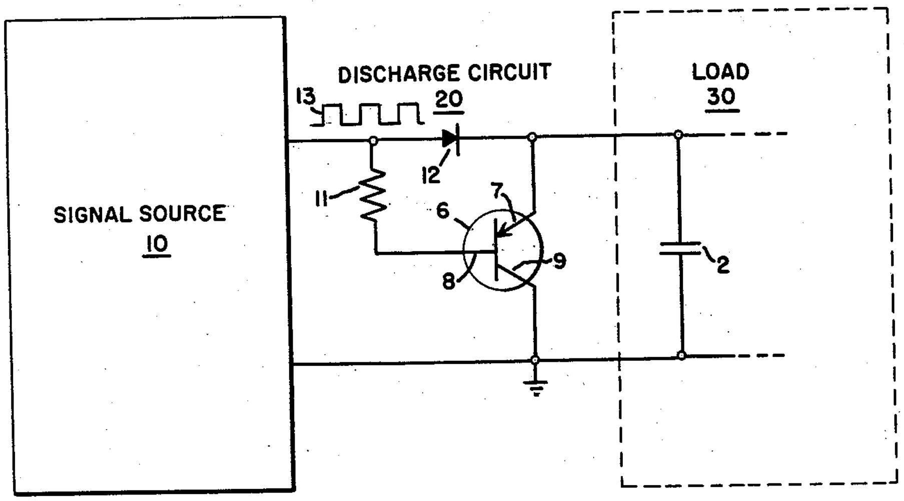
INVENTOR:
RICHARD W. HECKELMAN,
BY Dudley T. Ready
HIS AGENT.

VARIABLE TRANSISTOR CIRCUIT DISCHARGING A STORED CAPACITANCE FROM A LOAD

Richard W. Heckelman, Syracuse, N.Y., assignor to General Electric Company, a corporation of New York Filed Aug. 19, 1960, Ser. No. 50,688
6 Claims. (Cl. 307—88.5)

This invention relates primarily to unipolarity pulse circuitry and in particular to a circuit which provides for rapid discharge of energy stored in loads such as arises from capacitance in the load.

When a load connected to a signal source includes a shunt capacitance, it is generally necessary to remove the charge accumulated on the capacitance in order for the load voltage to follow variations in the applied signal. The required discharge path is often provided by a path through the signal source or by a load resistance present in parallel with the shunt capacitance. The time required for charge dissipation from the shunt capacitance can be determined as a resistive-capacitive exponential decay. When the inherent time constant of the circuit is too large, it is standard procedure to provide an additional resistance element in shunt with the load to reduce the discharge time. The shunt resistance element seen by the voltage source requires additional source current, and the smaller the shunt path resistance is made in order to reduce the discharge time, the greater will be the waste of signal power.

This problem is particularly serious where the signal is unipolar, since there is no opposing signal with which to drive the capacitance charge back down. If the circuit includes an asymmetric conductance such as a rectifier in series between the signal source and the load (and there is no satisfactory discharge path through the load), the average voltage developed across the shunt capacitance tends to rise rapidly to the peak value of the charging signal source. Also, similar problems arise in a variety of load circuits which have energy storing characteristics similar to a shunt capacitance. For example, in a D.C. motor, the kinetic energy of the armature tends to develop a reverse E.M.F. analogous to a charged shunt capacitance.

Accordingly, it is an object of the invention to provide an efficient discharge circuit for load circuits such as those including shunt capacitance supplied by unidirectional sources.

A further object is to provide a rapid discharge circuit for a shunt capacitance in a load supplied by a source of unidirectional pulses in a manner providing reduced signal power dissipation.

Briefly stated, in accordance with one aspect of the invention, the shunt capacitance in a load is discharged through a discharge circuit including a variable conductance device as controlled by the load current conditions. A rectifier is connected in series between one of a pair of signal source output terminals and one of the load terminals and polarized for low impedance passage of unipolar pulses from the signal source. The variable-impedance device, having a pair of principal electrodes and a control element, is connected to provide a controllable conductance shunt path across the load terminals through the principal electrodes. The control element is coupled to one of the signal source terminals so as to respond to the voltage drop across the rectifier such that forward conduction of the rectifier will maintain the shunt conductance at a low value, while reverse conduction will maintain the shunt conductance at a high value, rapidly discharging the load.

The features of the invention which are believed to be novel are set forth with particularity in the appended claims. The invention itself, however, both as to its organization and method of operation, together with further objects and advantages thereof, may best be understood by reference to the following description when taken in connection with the drawing, wherein:

The FIGURE illustrates a preferred embodiment of the invention.

The FIGURE is a schematic diagram of a preferred embodiment of the applicant's invention. The novel discharge circuit 20 is illustrated as interposed between the output portion of a signal source 10 and a typical load 30. The unidirectional pulse generator 10 and the load 30 are conventional structures respectively representative of signal sources and signal loads to which the applicant's invention as incorporated in the discharge circuit 20 can be applied.

The signal source 10 is representative of any unipolarity signal source which has a poor discharge ability relative to its charging ability. Of particular interest are rectangular pulse signals as shown at 13 and the like which are characterized by substantial voltage variations with short fall times.

The load circuit 30 is representative of those circuits which include a shunt capacitance 2 or equivalent energy storage elements. The range of circuit contemplated include such diverse applications as digital logic circuits which utilize transistors and control circuits using D.C. motors. The essential feature is a load which includes an energy storing device typified by a shunt capacitance which opposes a fall in signal voltage.

The discharge circuit 20 interposed between the signal source and the load utilizes a pnp junction transistor 6 as a variable conductance device to provide the discharge path in shunt with the load. The transistor connections are made with the emitter 7 and the collector 9 across the output lines of the discharge circuit and thereby in parallel with the load. A rectifier 12 is connected in series with the load between input and output lines of the discharge circuit and is polarized to pass signals from the source 10. (Junction diodes similar to type 1N116 are suitable for use with transistors similar to type 2N123.) A current limiting resistor 11 couples the base 8 of transistor 6 to the input line side of rectifier 12 and the collector 9 is connected to the load line remote from the rectifier. The small pulse current shunted through the base to collector capacitance is minimized by the resistor 11, typically 5 kilohms. Resistor 11 also provides less susceptibility to oscillatory instability as compared to conventional emitter followers.

The discharge circuit 20 illustrated in the figure provides efficient means for discharging a shunt capacitance. During application of a positive polarity signal, typically ten volts, from the signal source 10 the signal level is substantially unaffected by the discharge circuit. There will be a small voltage drop across the rectifier 12, typically on the order of one third of a volt, which provides a reverse bias on the transistor 6. This will maintain the transistor 6 current drain on the signal source at a very small value. When the signal voltage falls below the reverse load voltage, the voltage drop across the rectifier 12 will be of reverse polarity and thus provide a forward bias on the transistor 6. This will maintain a high shunt conductance in the transistor 6 which quickly discharges the load.

The asymmetrical impedance of the diode is essential to the efficinecy of the charge circuit. The low, forward impedance causes only small impairment of the signal voltage while providing a potential which holds the transistor shunt path to negligible conduction, and the high, reverse impedance at termination of the signal voltage produces a potential to obtain an optimum discharge path.

Without applicant's novel circuit, the shunting resistances typically required to produce acceptable time constants in the load, dissipate one half of the signal pulse energy. With applicant's novel circuit, the pulse energy available to the load is substantially undiminished. The invention is then of particular utility in logic circuits wherein pulse drivers are commonly required to drive many loads in parallel.

Where pulses must be distributed to a multiplicity of parallel loads and there exists a possibility of trouble from load-to-load crosstalk, then the disclosed discharge circuit 20 may be used to isolate the various loads without excessive drain being placed upon the signal source. If a discharge circuit is connected between the pulse source and each of a group of parallel loads, the discharge circuit will effectively isolate each group of loads from the remaining groups.

The transistor 6 in the figure may be a type 2N123 or the equivalent for a source employing positive ten-volt pulses with a fifty percent duty cycle to a load having a shunt capacitance of one thousand to five thousand micro-microfarads. For negative polarity pulses, npn transistors should be substituted for the pnp transistor 6 and the rectifier 12 should be polarized in the opposite direction.

The basic circuit is equally useful when power transistors and power diodes are used to provide larger currents at lower speeds. Or alternatively a plurality of active devices may be connected in parallel to provide heavier discharge current capability. Other types of active elements such as avalanche transistors, double-base diodes, thyratrons and vacuum tubes may be used providing the voltage and current requirements can be met. Note that thyratrons and vacuum triodes correspond to npn transistors and have no pnp counterpart. The pnp and npn versions of the discharge circuit are interchangeable only when it is permissible to interchange the signal leads with respect to the ground reference. Furthermore, the usefulness of avalanche devices in the absence of more complicated control circuits is limited to applications where the load energy is completely discharged before the next charge pulse occurs.

While particular embodiments of the invention have been shown and described, it should be understood that the invention is not limited thereto and it is intended in the appended claims to claim all such variations as fall within the true sprit of the present invention.

What is claimed is:

1. In combination: a source of unidirectional signals having a pair of output terminals; a load device having appreciable input shunt capacitance at its input terminals; a rectifier inserted in series between one of said source terminals and one of said load terminals polarized for low-impedance passage of said signals; means connecting the other source terminal and the other load terminal; and means responsive to accumulated charge for discharging said shunt capacitance comprising: a variable-conductance device having a control element and a pair of principal electrodes between which said conductance is controlled by the application of voltage to a control element; means connecting said principal electrodes in shunt across said load for providing a controllable conductance shunt path therefor; and means connecting said control element to one of said source terminals, said control electrode being coupled to respond to the voltage drop in said rectifier and thereby maintain said shunt conductance at a low value upon the passage of said signals and at a high value for discharging said load when the load produces a reverse polarity voltage across said rectifier.

2. In combination, a source of unidirectionl pulses having a pair of output terminals; a load device having appreciable input shunt capacity at its input terminals; a rectifier inserted between one of said source terminals and one of said load terminals polarized for easy passage of pulses; means connecting the other source terminal and the other load terminal; and means responsive to accumulated charge for discharging said shunt capacity including a junction transistor having its emitter and collector electrodes coupled in shunt across said load for providing a controllable conductance shunt path therefor, said emitter and the base electrode of said transistor being coupled to respond to the voltage drop in said rectifier and thereby maintain said shunting conductance at a low value upon the passage of said pulses and at a high value for discharging said load when the stored charge in said load capacitance produces a reverse polarity across said rectifier.

3. The combination of claim 2 in which: a resistor is connected in series with said base electrode of the transistor to provide current limitation.

4. The combination of claim 2 in which: said transistor is a pnp type transistor, said transistor and said rectifier being arranged to pass positive pulses.

5. The combination of claim 2 in which: said transistor is an npn type transistor.

6. The combination of claim 2 wherein said diode is a junction diode.

References Cited in the file of this patent

FOREIGN PATENTS

| | | |
|---|---|---|
| 802,307 | Great Britain | Oct. 1, 1958 |
| 829,261 | Great Britain | Mar. 2, 1960 |